United States Patent
Russell

(10) Patent No.: US 7,406,159 B2
(45) Date of Patent: Jul. 29, 2008

(54) METHODS, SYSTEMS, AND COMPUTER PROGRAM PRODUCTS FOR AUTOMATICALLY POPULATING SIGNALING-BASED ACCESS CONTROL DATABASE

(75) Inventor: Travis Earl Russell, Clayton, NC (US)

(73) Assignee: Tekelec, Morrisville, NC (US)

( * ) Notice: Subject to any disclaimer, the term of this patent is extended or adjusted under 35 U.S.C. 154(b) by 387 days.

(21) Appl. No.: 10/891,903

(22) Filed: Jul. 15, 2004

(65) Prior Publication Data

US 2006/0013372 A1    Jan. 19, 2006

(51) Int. Cl.
*H04M 15/00* (2006.01)
(52) U.S. Cl. .............................. 379/114.14; 379/144.03
(58) Field of Classification Search ............ 379/114.01, 379/114.14, 114.28, 115.01, 145, 210.02, 379/229–230, 114.04, 143, 144.03
See application file for complete search history.

(56) References Cited

U.S. PATENT DOCUMENTS

| | | | | |
|---|---|---|---|---|
| 5,592,530 A | * | 1/1997 | Brockman et al. | 379/32.03 |
| 5,907,602 A | * | 5/1999 | Peel et al. | 379/114.14 |
| 6,320,947 B1 | * | 11/2001 | Joyce et al. | 379/114.2 |
| 6,327,350 B1 | | 12/2001 | Spangler et al. | |
| 6,363,411 B1 | * | 3/2002 | Dugan et al. | 709/202 |
| 6,421,428 B1 | | 7/2002 | Carman et al. | |
| 6,718,023 B1 | * | 4/2004 | Zolotov | 379/133 |
| 6,856,982 B1 | * | 2/2005 | Stevens et al. | 706/50 |
| 2002/0054674 A1 | | 5/2002 | Chang et al. | |
| 2002/0103899 A1 | * | 8/2002 | Hogan et al. | 709/224 |

OTHER PUBLICATIONS

"Solution Blueprint: Subex Ranger* Fraud Management System." Subex Systems Ltd., pp. 1-17.
International Search Report and Written Opinion of the International Searching Authority corresponding to International Application No. PCT/US05/23342 dated Jan. 17, 2007.

* cited by examiner

*Primary Examiner*—Binh K Tieu
(74) *Attorney, Agent, or Firm*—Jenkins, Wilson, Taylor & Hunt, P.A.

(57) ABSTRACT

Methods, systems, and computer program products for automatically populating a signaling-based access control database based on output from a fraud detection application are disclosed. According to one method, a fraud detection application detects fraud based on call information received from monitoring points in a network. The fraud detection application produces output for identifying a calling party making a fraudulent call. The output is used to automatically populate a signaling-based access control database. A signaling-based access control application screens call signaling messages and performs a screening action, such as rerouting a call, using the information received from the fraud detection application.

24 Claims, 2 Drawing Sheets

METHODS, SYSTEMS, AND COMPUTER PROGRAM PRODUCTS FOR AUTOMATICALLY POPULATING SIGNALING-BASED ACCESS CONTROL DATABASE

TECHNICAL FIELD

The present invention relates to fraud detection in a telecommunications network. More particularly, the present invention relates to methods, systems, and computer program products for automatically populating a signaling-based access control database based on output from a fraud detection application.

BACKGROUND ART

In telecommunications networks, fraud detection applications exist to detect fraudulent calls. For example, some fraud detection applications include rules-based or artificial-intelligence-based algorithms for detecting the presence of telecommunications network fraud. Once fraud for a given call is detected, the fraud detection application may generate an alarm to the telecommunications network service provider. Another action performed by one conventional fraud detection application is to insert white noise on a voice channel associated with a fraudulent call to disrupt the fraudulent call. One problem with this fraud detection application is it requires probes on all of the voice trunks in a network to insert the white noise. Requiring probes on all of the voice trunks can be expensive in networks with large numbers of voice trunks.

Signaling-based access control applications can also be used to mitigate fraud in telecommunications networks. For example, one conventional signaling-based access control application screens call signaling messages and performs screening actions for the call signaling messages based on information provisioned in an access control database.

One problem with using conventional signaling-based access control applications to mitigate fraud is that these applications are unsuitable for detecting fraud in real time or near real time because the signaling-based access control databases are manually provisioned. That is, once a network operator learns of telecommunications network fraud, the network operator is required to manually provision the appropriate information in the signaling-based access control database to prevent future occurrences of the fraud. However, fraud may continue from the time that the fraud is detected to the time that the database is provisioned. In addition, manually provisioning the database is labor intensive.

Thus, in light of the difficulties associated with conventional fraud detection applications, there exists a need for improved methods for detecting and preventing fraud in telecommunications networks.

DISCLOSURE OF THE INVENTION

According to one aspect, the present invention includes a method for automatically populating a signaling-based access control database. According to this method, call detail records (CDRS) are generated and provided to a fraud detection application. At the fraud detection application, the CDRs are analyzed to detect fraudulent calls. The fraud detection application then outputs information for identifying a calling party who makes a fraudulent call. The output from the fraud detection application is used to automatically populate a signaling-based access control database. The signaling-based access control database is then used to block or reroute calls from the same calling party. Because the signaling-based access control database is automatically populated based on output from the fraud detection application, fraud can be prevented in a telecommunications network in real time or near real time.

The functionality described herein for automatically populating a signaling-based access control database based on data output from a fraud detection application may be implemented in hardware, software, firmware, or any combination thereof. In one exemplary implementation, the functionality described herein for automatically populating a signaling-based access control database may be implemented as a computer program product comprising computer executable instructions embodied in a computer readable medium. Exemplary computer readable media for implementing the functionality described herein includes disk storage devices, chip memory devices, and downloadable electrical signals, that are capable of storing computer executable instructions.

Accordingly, it is an object of the invention to provide improved methods and systems for mitigating fraud in telecommunications networks.

It is another object of the invention to provide methods and systems for automatically populating a signaling-based access control database based on output from a fraud detection application.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
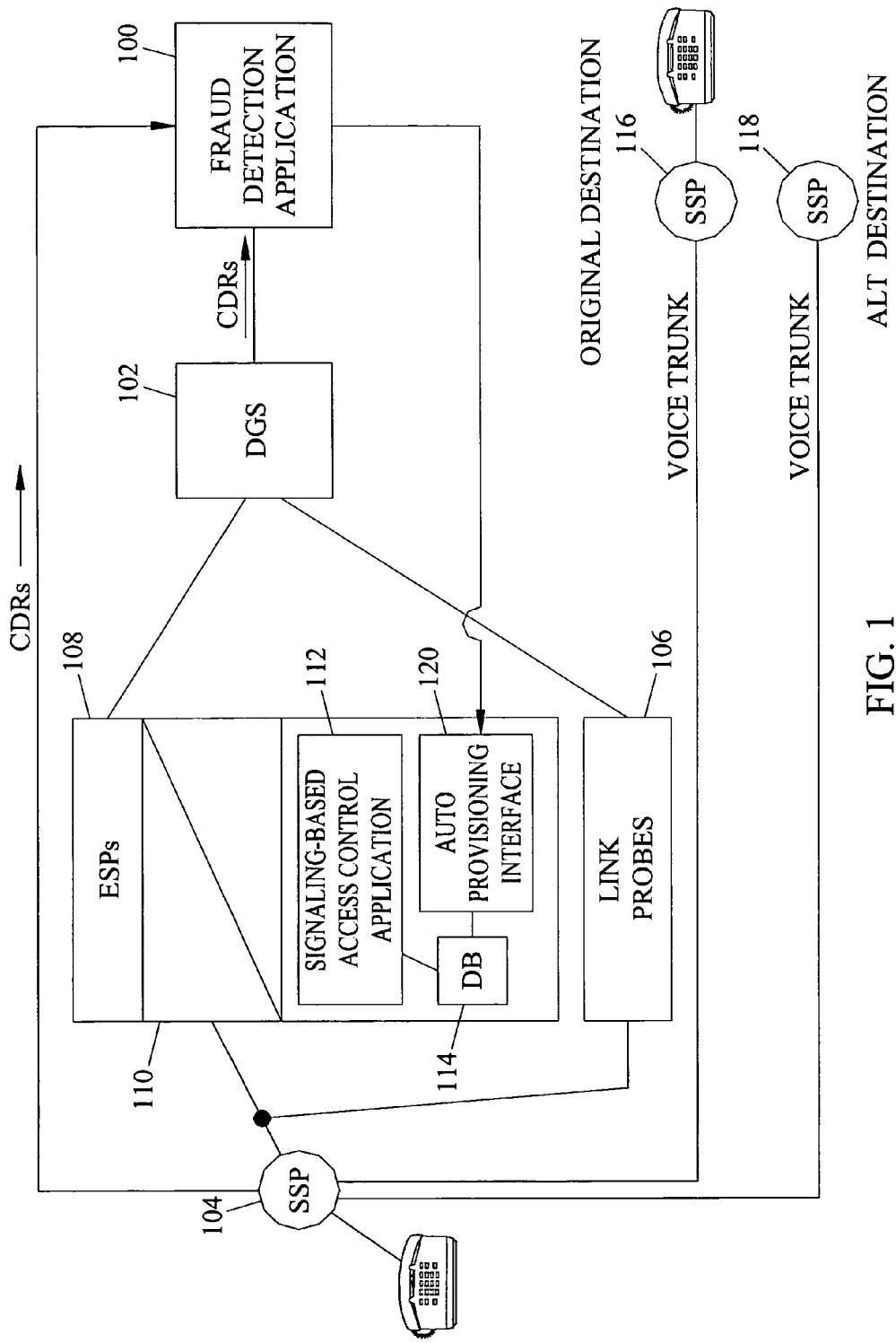
FIG. 1 is a network diagram of a telecommunications network including a fraud detection application and an access control database, where the access control database is automatically populated based on output from the fraud detection application according to an embodiment of the present invention.

As described above, the present invention includes methods and systems for automatically populating a signaling-based access control database based on output from a fraud detection application. FIG. 1 is a network diagram illustrating an exemplary signaling network including a fraud detection application and a signaling-based access control database, where the fraud detection application automatically populates the signaling-based access control database according to an embodiment of the present invention. Referring to FIG. 1, a fraud detection application 100 receives CDRs from a data gateway server (DGS) 102 and/or from an end office switch 104. Fraud detection application 100 may be any suitable fraud detection application that is capable of detecting fraudulent telephone calls and for producing an output useful for identifying fraudulent telephone calls. One example of a commercially available fraud detection application suitable for use with embodiments of the present invention is the Ranger™ fraud management system commercially available from Subex Systems Corporation. Data gateway server 102 comprises a computing platform that receives message signal unit (MSU) data from link probes 106 and/or network monitoring processors 108 and generates CDRs based on the MSUs. Network monitoring processors 108 receive MSUs copied internally by network monitoring transport cards within a signal transfer point 110.

An example of a commercially available system that may be used to provide data gateway server 102, link probes 106, network monitoring processors 108, and network monitoring transport cards internal to STP 110 is the Sentinel™ system available from Tekelec of Calabasas, Calif. Briefly, the Sentinel™ system includes message copy functions resident on link interface modules within the STP. The message copy functions copy signaling messages received on signaling links. When a message copy function has messages to deliver to a network monitoring application, the message copy function broadcasts a service request to an Eagle® Sentinel™ Processor (ESP) provisioned to serve the particular message copy function. The ESP may accept the service request by sending a service acceptance message to the requesting message copy function. A connection is then established between the copy function and the ESP via a Sentinel™ Transport Card (STC) internal to the STP. MSUs may then be sent to the ESP and stored in an MSU database resident on the ESP. The ESP may forward MSUs directly to a data gateway server or to a site collector, which sends the MSUs to the data gateway server. A site collector is a computing platform that collects and stores MSU data from multiple MSU data collection sites. A data gateway server is a computing platform that receives the MSU data from the site collectors and generates CDRs based on application-specific requirements, such as those specified by a fraud detection application.

In addition to internal network monitoring functionality, signal transfer point 110 may include a signaling-based access control application 112. Signaling-based access control application 112 may screen call signaling messages based on screening criteria specified in signaling-based access control database 114. Signaling-based access control application 112 may reroute or block messages based on the screening criteria, causing calls to be rerouted from an original destination, such as service switching point (SSP) 116 to an alternate destination, such as SSP 118.

One example of a signaling-based access control application suitable for use with embodiments of the present invention is described in commonly-assigned, co-pending U.S. patent application publication no. US 2002/0054674, the disclosure of which is incorporated herein by reference in its entirety. Briefly, such a signaling-based access control application is capable of triggerlessly screening call setup messages, such as ISUP messages or IP telephony call signaling messages, and rerouting or blocking the messages based on user-specified screening criteria. By "triggerlessly screening," it is meant that the signaling-based access control application intercepts call setup messages sent from an end office without requiring an end office trigger, an end-office-originated database query, and a response to determine whether the call should proceed.

According to the present invention, an auto provisioning interface 120 receives calling party identification information from fraud detection application 100 and automatically provisions that information in call screening or access control database 114. Auto-provisioning interface 120 may be a network application, such as a client or a server application, that receives messages sent by fraud detection application 100, parses the messages for calling party identification information, and provisions that information in database 114. In one exemplary implementation, auto provisioning interface 120 may include a server application that listens on a predetermined port for fraud detection messages from fraud detection application 100. When fraud detection application 100 has fraud detection data to send, a client application associated with fraud detection application 100 may send a message to the port and address at which the server application is listening.

In a preferred implementation, communications between fraud detection application 100 and auto provisioning interface 120 are authenticated and encrypted. For example, fraud detection application 100 and auto provisioning interface 120 may use secure socket layer (SSL) to authenticate each other, establish a secure TCP-based communications session, and communicate the fraud detection messages over the session. Establishing a secure communications channel is desirable for sending the fraud detection messages, since these messages include data that will be used by signaling-based access control application 112 to screen call setup signaling messages and block or re-route the associated calls.

Because signaling-based access control database 114 is automatically provisioned based on output from fraud detection application 100, fraud detection in a telecommunications network can be prevented in real time or near real time with minimal effort by the telecommunications network operator.

Figure 2:
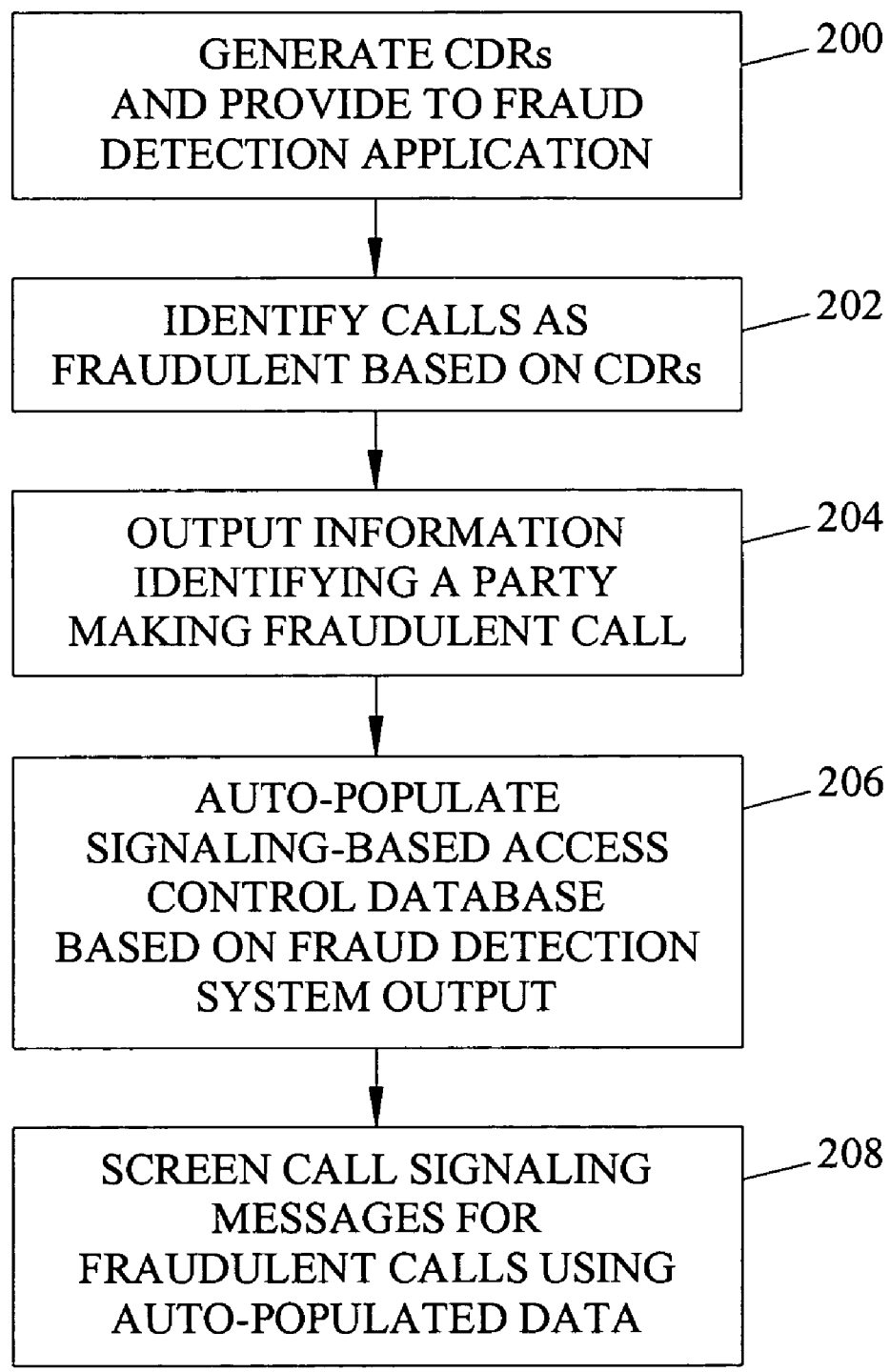
FIG. 2 is a flow chart illustrating exemplary steps for automatically populating a signaling-based access control database based on output from a fraud detection application according to an embodiment of the present invention.

FIG. 2 is a flow chart illustrating exemplary steps that may be performed by the system illustrated in FIG. 1 in automatically provisioning signaling-based access control database 114 based on the output from fraud detection application 100. Referring to FIG. 2, in step 200, CDRs are generated and provided to fraud detection application 100. The CDRs may be generated by data gateway server 102 based on MSUs received from external link probes 106 or network monitoring processors 108. Alternatively, the CDRs may be switched-based CDRs generated by switch 104. Generating CDRs may include correlating call setup signaling messages relating to the same call. An exemplary method for generating CDRs is described in commonly-assigned U.S. Pat. No. 6,327,350, the disclosure of which is incorporated herein by reference in its entirety.

The CDRs may include parameters extracted from signaling messages associated with call setup. The parameters may be those usable by fraud detection application 100 to detect fraud. One category of parameters or information that may be of interest in automatically populating signaling-based access control database 114 includes calling party information, such as the calling party location or directory number. For SS7 call signaling messages, the calling party directory number may be extracted from the ISUP portion of the messages. For SIP call setup messages, the calling party number may be extracted from the FROM field of the messages.

The present invention is not limited to providing CDRs to a fraud detection application or to fraud detection applications that detect fraud based on CDRs. In an alternate implementation, data gateway server 102 may provide signaling messages or signaling message parameters to fraud detection application 100, and fraud detection application 100 may detect the presence of fraud based on the signaling messages or signaling message parameters. In such an implementation, fraud detection application 100 may include its own internal message correlator for correlating messages relating to the same call.

The CDR and/or signaling message data may be communicated to fraud detection application application 100 in any suitable manner. In one exemplary implementation, data gateway server 102 may include a network file system (NFS)

interface that allows fraud detection application 100 to mount the directory of data gateway server 102 in which the CDR and/or signaling message data is stored. In such an implementation, fraud detection application 100 may function as an NFS client.

In step 202, fraud detection application 100 identifies fraudulent calls based on the CDRs. As stated above, commercially available fraud detection applications, such as the Subex Ranger™ fraud detection application, identify fraud in calls using rules-based and artificial-intelligence-based fraud detection criteria. However, the present invention is not intended to be limited to any particular method for detecting fraud. Any suitable method for identifying a fraudulent telephone call is intended to be within the scope of the invention.

In step 204, fraud detection application 100 outputs information identifying the party making the fraudulent call. Such information may include the calling party directory number or other suitable calling party identification information. Fraud detection application 100 provides this information to auto provisioning interface 120 of signaling-based access control database 114. As described above, this step may be performed by establishing a secure communications channel between fraud detection application 100 and auto provisioning interface 120 and sending messages including the calling party identification information over the secure channel. In step 206, auto provisioning interface 120 populates database 114 based on the output received from fraud detection application 100. This step may be performed by parsing the fraud detection message, extracting the calling party identification information, and writing the information to database 114. Table 1 shown below illustrates an exemplary entry that may be provided in database 114 for screening and rerouting signaling messages based on output received from fraud detection application 100.

TABLE 1

Signaling-Based Access Control Screening Database

| Calling Party Number | Action | Destination |
|---|---|---|
| 9194605500 | Reroute | 9194938000 |

In Table 1, the entry includes a calling party number, an action, and a destination. If signaling-based access control application 112 receives a call signaling message is received with the calling party number 9194605500, the call signaling message will be rerouted to an end office associated with 9194938000. If database 114 is provisioned to screen IP telephony calls, the calling party number field in Table 1 may include any suitable IP telephony calling party identification information, such as calling party SIP URL, calling party IP address, etc. The destination field may similarly include IP telephony destination information, such as destination IP address and port number.

Because entries in database 114 are automatically populated, fraud can be detected and eliminated in real time or near real time. For example, a soon as fraud detection application detects fraud, any calls made by the same calling party will be rerouted and/or blocked. In addition, for the existing call in progress, signaling-based access control application 112 may cause the call to be dropped, i.e., by sending a release message to the end offices associated with the call.

Thus, as described above, the present invention includes methods and systems for automatically populating a signaling-based access control database based on output from a fraud detection application. Such a system reduces the time to populate a signaling-based access control database and thereby reduces fraud in telecommunications networks.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for automatically populating a signaling-based access control database comprising:
    (a) collecting signaling message data for signaling messages relating to calls in a telecommunications network;
    (b) providing the signaling message data to a fraud detection application;
    (c) receiving, from the fraud detection application, information identifying a calling party making a fraudulent call;
    (d) automatically populating a signaling-based access control database based on the information received from the fraud detection application; and
    (e) screening call signaling messages based on the information received from the fraud detection application that is stored in the signaling based access control database and performing screening actions for the screened call signaling messages.

2. The method of claim 1 wherein the signaling message data includes SS7 signaling message data.

3. The method of claim 2 wherein the SS7 signaling message data includes SS7 message signal unit (MSU) parameters.

4. The method of claim 2 wherein the SS7 signaling message data includes SS7-based call detail records (CDRs).

5. The method of claim 1 wherein the signaling message data includes IP telephony signaling message data.

6. The method of claim 1 wherein automatically populating a signaling-based access control database includes automatically populating a signaling-based access control database co-located with a signal transfer point.

7. The method of claim 1 comprising screening call signaling messages and performing mitigating actions using the information automatically populated in the signaling-based access control database.

8. The method of claim 7 wherein performing a mitigating action includes rerouting the call signaling messages to alternate destinations, thereby rerouting calls associated with the call signaling messages to the alternate destinations.

9. A system for mitigating fraud in telecommunications networks, the system comprising:
    (a) a fraud detection application for detecting fraud in a telecommunications network and for producing output for identifying a party making a fraudulent call;
    (b) a signaling-based access control database for storing signaling-based call screening criteria;
    (c) a signaling-based access control application for screening call signaling messages based on information stored in the access control database; and
    (d) an auto provisioning interface for receiving the information output from the fraud detection application and for automatically populating the access control database with the information, wherein the signaling based access control application screens call signaling messages using the information received from the fraud detection application that is stored in the signaling based access control database and performs screening actions for the screened call signaling messages.

10. The system of claim 9 wherein the fraud detection application is adapted to detect fraudulent calls based on call detail records (CDRs).

11. The system of claim 9 wherein the fraud detection application is adapted to detect fraud for calls established using SS7 signaling.

12. The system of claim 9 wherein the fraud detection application is adapted to detect fraud for calls established using IP telephony signaling.

13. The system of claim 11 wherein the fraud detection application is adapted to output SS7-based calling party information for calls identified as fraudulent and wherein the auto provisioning interface is adapted to populate the access control database with the SS7-based calling party information.

14. The system of claim 12 wherein the fraud detection application is adapted to output IP telephony calling party information for calls identified as fraudulent and wherein the auto provisioning interface is adapted to automatically populate the access control database with the IP telephony calling party identification information.

15. The system of claim 9 wherein the signaling-based access control application is adapted to reroute calls based on actions specified in the access control database.

16. The system of claim 9 wherein the signaling-based access control application is adapted to block calls based on actions specified in the access control database.

17. A computer program product comprising computer-executable instructions embodied in a computer readable medium for performing steps comprising:
(a) screening call setup signaling messages based on data stored in a signaling-based access control database;
(b) receiving, from a fraud detection application, information identifying a calling party making a fraudulent call;
(c) automatically populating the signaling-based access control database based on the information received from the fraud detection application; and
(e) screening call signaling messages based on the information received from the fraud detection application that is stored in the signaling based access control database and performing screening actions for the screened call signaling messages.

18. The computer program product of claim 17 wherein call setup signaling messages includes triggerlessly screening call setup messages by redirecting the messages from their original destinations to a signaling-based access control application.

19. The computer program product of claim 17 wherein receiving information from the fraud detection application information for identifying a calling party making a fraudulent call includes receiving a fraud detection message from the fraud detection application.

20. The computer program product of claim 17 wherein automatically populating the signaling-based access control database includes automatically populating a signaling-based access control database co-located with a signal transfer point.

21. The computer program product of claim 17 comprising performing fraud mitigating actions using the information automatically populated in the signaling-based access control database.

22. The computer program product of claim 21 wherein performing fraud mitigating actions includes rerouting call setup signaling messages identified as being associated with fraudulent calls to alternate destinations, thereby rerouting calls associated with the call setup signaling messages to the alternate destinations.

23. The computer program product of claim 21 wherein performing fraud mitigating actions includes blocking call setup signaling messages identified as being associated with fraudulent calls.

24. The computer program product of claim 21 wherein performing fraud mitigating actions includes performing the fraud mitigating actions in real after the fraud detection application detects fraudulent calls.

* * * * *